United States Patent

Fetting et al.

[15] 3,661,494

[45] May 9, 1972

[54] PROCESS FOR CARRYING OUT ENDOTHERMIC GAS REACTIONS

[72] Inventors: Fritz Fetting, Darmstadt-Eberstadt; Henning Bockhorn, Darmstadt; Hans-Adolf Herbertz, Neu-Isenburg, all of Germany

[73] Assignee: Deutsche Gold-und Silber-Schneideanstalt vormals Roessler, Frankfurt (Main), Germany

[22] Filed: Apr. 27, 1970

[21] Appl. No.: 32,008

[52] U.S. Cl. .............................................. 431/4, 263/19 A
[51] Int. Cl. ............................................................. F23j 7/00
[58] Field of Search .......................... 431/174, 8, 4; 263/19; 239/423, 424, 431

[56] References Cited

UNITED STATES PATENTS

| | | | |
|---|---|---|---|
| 3,115,009 | 12/1963 | Ledwith et al. | 239/424 X |
| 3,342,241 | 9/1967 | Whitesides | 431/353 X |
| 3,504,994 | 4/1970 | Desty et al. | 263/19 X |
| 3,221,499 | 12/1965 | Hasbrouck | 239/424 X |
| 3,267,927 | 8/1966 | Hirschberg | 239/431 X |

*Primary Examiner*—Edward G. Favors
*Attorney*—Cushman, Darby & Cushman

[57] ABSTRACT

Production of hydrogen cyanide is carried out by means of a flame reaction by reacting the feed components in flames produced by a combustible gas mixture and admixing a secondary gas stream into said flames. The secondary gas can flow either parallel to or transversely to the combustible gas. One embodiment of the invention consists in passing ammonia into a hydrocarbon/oxygen-flame front. Another embodiment of the invention consists in passing hydrogen or carbon monoxide into the flame front of a hydrocarbon/ammonia/oxygen-flame.

8 Claims, 4 Drawing Figures

INVENTORS
FRITZ FETTING
HENNING BOCKHORN
HANS-ADOLF HERBERTZ

PROCESS FOR CARRYING OUT ENDOTHERMIC GAS REACTIONS

The invention relates to a process for carrying out endothermic conversion of light hydrocarbon and ammonia into hydrogen cyanide in flames without the use of catalysts.

In the case of this endothermic gas reaction, the required reaction enthalpy must be put at one's disposal on the basis of thermodynamic rules, that is to say at relatively high reaction temperatures. These conditions can be realized among others in flames in which large amounts of energy can be liberated in a small space at a high temperature.

In the case of carrying out said endothermic gas reaction in flames, an exothermic combustion reaction is coupled with an endothermic synthesis reaction. Both partial reactions take place simultaneously one beside the other in the case of one-step processes in the manner of incomplete combustion, while in the case of two-step processes the initial products of the endothermic synthesis reaction are mixed and made to react with the hot combustion gases of one or several energy producing flames. The formed hydrogen cyanide is not stable at the required synthesis temperatures and it has to be converted to a thermodynamically metastable state through considerable cooling after very short reaction times. The required chilling of the hot reaction gases takes place through direct injection of a cooling medium through heat exchangers (DBP 1,159,409) or through dynamic cooling (British Pat. No. 852,072).

According to the invention, higher yields can be achieved by bringing the light hydrocarbon or a part of it to react together with oxygen in flames burning in a stationary manner, and by admixing a stream of gas (secondary gas) into the flame fronts. In a preferred form of the invention, the endothermic gas reaction is carried out in jet flames which burn in an environment of ammonia as secondary gas. Through jet mixing this ammonia is sucked up from the downstream side by the jet flames and mixed into the flame fronts. In this way the concentration and temperature profiles in the reaction zones can be influenced in such a manner that the synthesis of hydrogen cyanide will take place at higher yields.

In one form of the invention the ammonia is conducted in parallel flow with the combustible gas mixture into a combustion chamber. The combustible gas flows from a nozzle into the combustion chamber and reacts therein in one or more jet flames having a flame front. The ammonia is admixed with the flame front from any suitable means defining a gap around the nozzle from which the combustible gas flows. The mixing process is controlled by suitable selection of the momentum ratio of the two gas streams.

In another form of the invention the secondary ammonia stream is introduced into the combustion chamber from the bottom and the combustible gas mixture is introduced into the chamber from one or more nozzles arranged in the wall thereof slantingly or transversely with respect to the secondary gas stream. The secondary gas stream is admixed with the burning combustible gas mixture and the mixing process is controlled by suitable selection of the momentum ratio of the two gas streams.

In another embodiment of the invention, the reaction is carried out in premixed flames consisting of light hydrocarbon, oxygen and ammonia which burn in an environment of hydrogen or carbon monoxide. The intermingling of the hydrogen or carbon monoxide with the flame can take place in the two ways mentioned above where ammonia is intermingled with hydrocarbon/oxygen jet flames.

The invention will be understood best in connection with the drawings which give illustrative examples of apparatuses for carrying out endothermic gas reactions according to the process of the invention.

Figure 1:
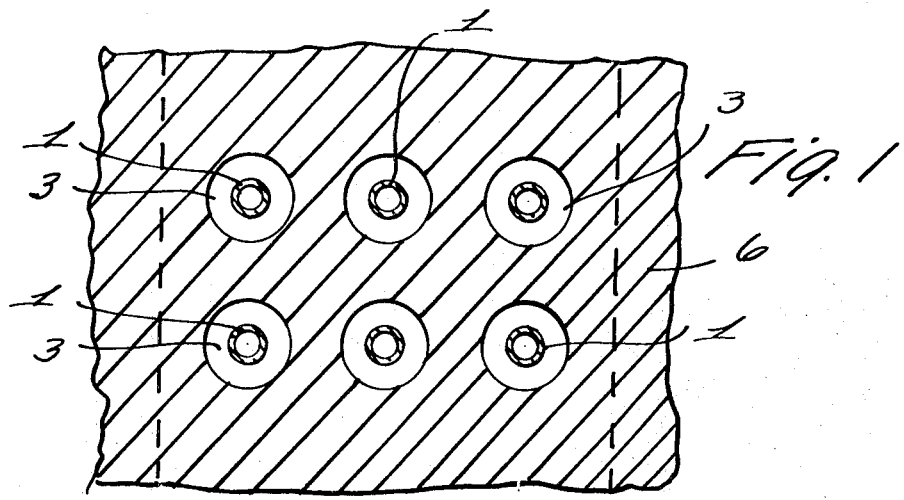
FIG. 1 represents a first embodiment of an arrangement according to the process of the invention in longitudinal section.
Figure 2:
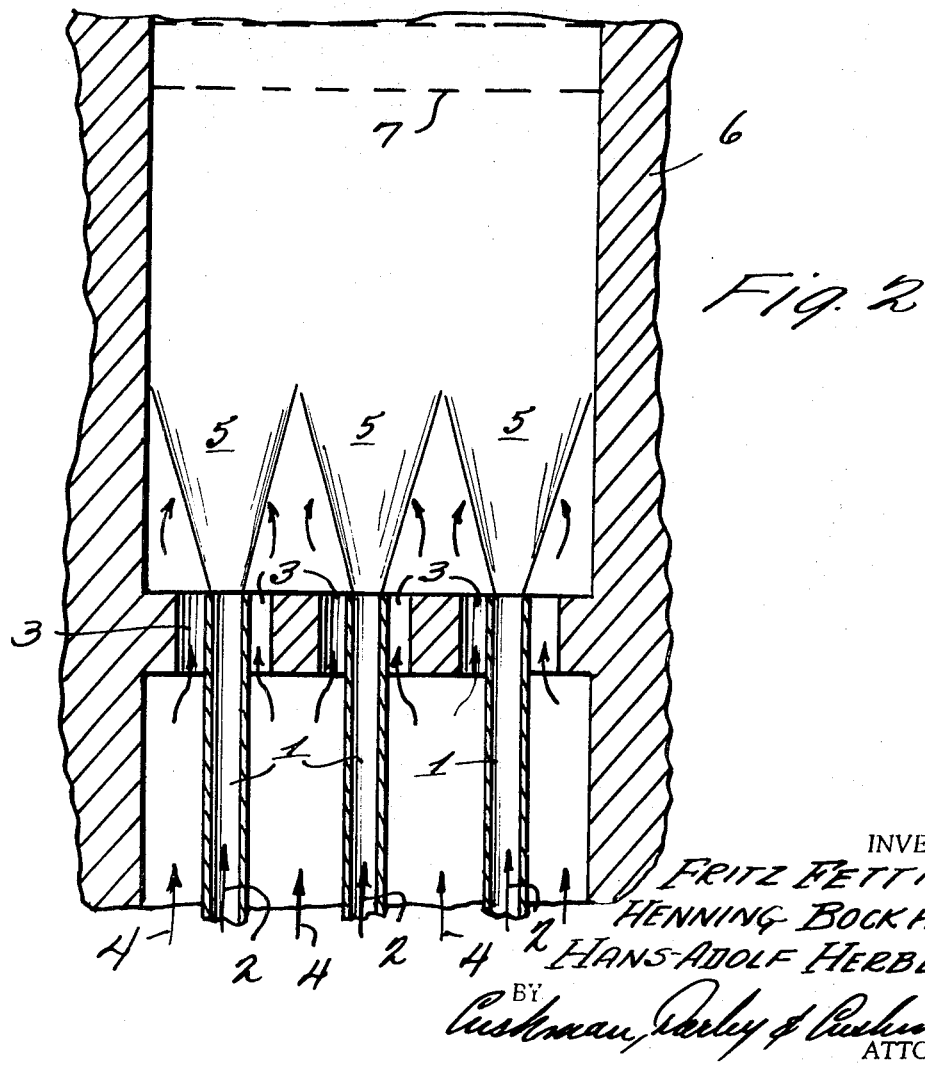
FIG. 2 is a cross section of the apparatus of FIG. 1.

Referring more specifically to the embodiment of the invention according to FIGS. 1 and 2, a gas mixture 2 of light hydrocarbon and oxygen or of light hydrocarbon and oxygen and ammonia is conducted through a number of nozzles 1 (here shown as round). Each of the nozzles 1 is surrounded by a flow channel 3 shown as an annular gap, through which the secondary gas ammonia or light hydrogen or carbon monoxide 4 is conducted. The combustible mixture 2 reacts from the inside nozzles 1 in the form of jet flames 5. Through suitable selection of the momentum ratio of the jet emerging from an opening 1, to the gas emerging from an opening 3, the mixing process can be controlled. The above-mentioned arrangement is surrounded by the walls of the combustion chamber 6, in which the hot reaction gases are cooled off at a suitable place through cooling apparatus 7.

Figure 3:
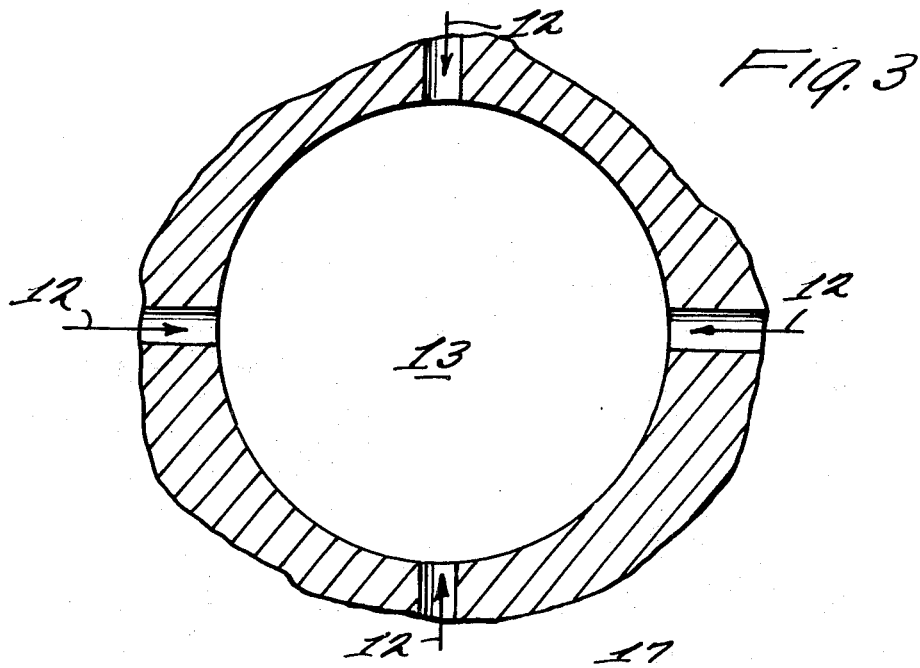
FIG. 3 shows a second embodiment of an apparatus according to the process of the invention in longitudinal section.
Figure 4:
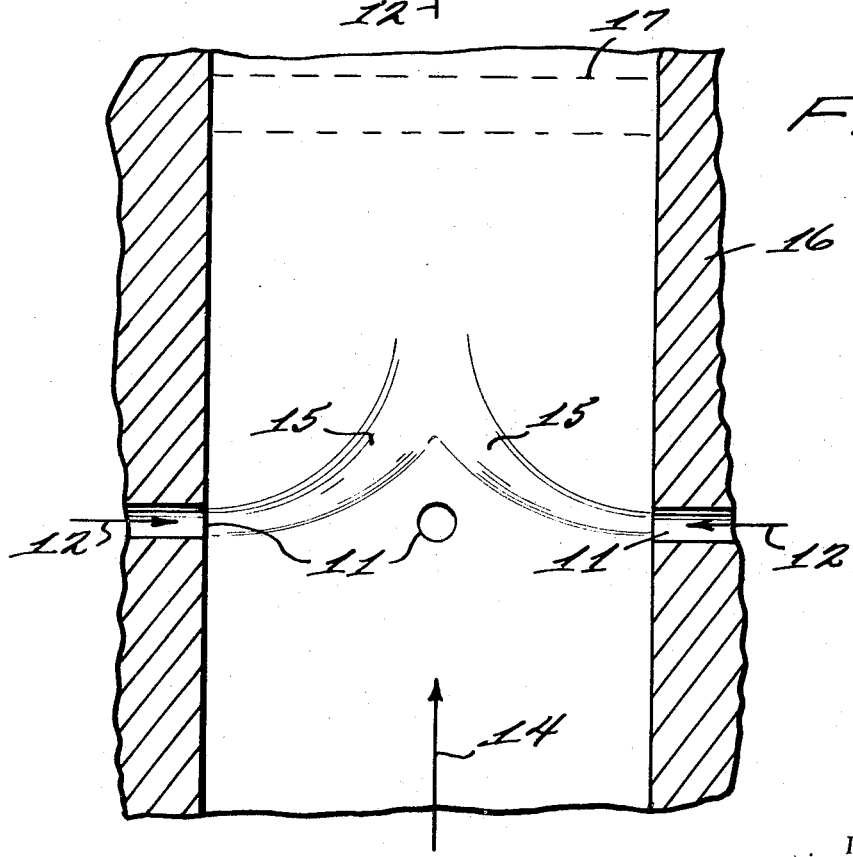
FIG. 4 is a cross section of the apparatus of FIG. 3.

In the embodiment of the invention according to FIGS. 3 and 4, a mixture of light hydrocarbon and oxygen or of light hydrocarbon and oxygen and ammonia is conducted through the nozzles 11, in this case drawn round, and which are located in the wall 16 of the combustion chamber. The secondary gas ammonia, or hydrogen or carbon monoxide 14, flows upwardly in a flow channel 13 (here shown cylindrically). The combustible mixture 12 is reacted beginning at the nozzles 11 in transversely flowing jet flames 15, whereby the secondary gas 14 is sucked in. Through a suitable choice of the momentum ratio of the jet emerging from an opening 11 to the stream 14 of secondary gas, the mixing process can be controlled. At a suitable place, the hot reaction gases are cooled off through a suitable cooling device 17.

In the previously described apparatuses the synthesis of hydrogen cyanide from light hydrocarbons, ammonia and oxygen was carried out with satisfactory yields. This is further illustrated by the following typical examples.

EXAMPLE 1

In the apparatus of FIGS. 1 and 2, a mixture 2 consisting of about 1.5 $Nm^3/h$ [$Nm^3$ = standard cubic meter] of propane and about 2.7 $Nm^3/h$ of oxygen (C/O ratio 0.83) was conducted through 19 nozzles 1 of 1 mm inside diameter into the reaction chamber. Approximately 0.97 $Nm^3/h$ of ammonia was conducted as secondary gas 4 through the flow channels 3 developed as annular gaps with an outside diameter of 3.5 mm (C/N ratio 4.7:1). The ratio of the volume of streams of combustible mixture 2 to secondary gas 4 amounted to 4.3:1. The jet flames 5 burned starting from the nozzles 1 in an environment of ammonia gas flowing in the same direction. In the case of this experiment, a yield of 73 percent of hydrogen cyanide, based on the ammonia used, was achieved, whereby 83 percent of the reacted ammonia was converted in hydrogen cyanide (selectively of the reaction). The entire conversion of ammonia amounted to about 89 percent.

EXAMPLE 2

In the apparatus of FIGS. 3 and 4, experiments for the synthesis of hydrogen cyanide were carried out in the combustion chamber. For this purpose, combustible mixtures 12 of various hydrocarbons (see column 2 with volume through-put of the hydrocarbons), ammonia and oxygen were used in the experiments a to g of table 1, with the mixture compositions in column 5 and column 6. The secondary gases 14 used and their volume through-put have been noted in column 3, and the ratio of the streams of volume of combustible mixture 12 to secondary gas 14 in column 4. The yields and selectivities of hydrogen cyanide, related to ammonia, as well as the conversions of ammonia are found in columns 7, 8 and 9.

Corresponding to what has been said previously, in the case of experiments h and i of table 1, combustible mixture 12 of propane and oxygen was injected, which burned as transversely flowing jet flames 15 in a secondary gas stream 14 of ammonia. For experiment i, the composition of the reaction gases leaving the combustion chamber has been given in column 1 of table 2; the composition of the gases after a washing with cold, dilute sulfuric acid is found in column 2 and the composition of the residual gases after the HCN absorption, in column 3. In the case of all experiments mentioned by way of example, the synthesis temperature amounted to about 1,400° C., whereby the flame reactor was operated with a fresh gas load of about $10^5$ [$Nm^3/h, m^3$].

stream whereby it is reacting in at least one transversely or slantingly flowing jet flame.

4. A process according to claim 1 comprising conducting the secondary gas in parallel flow with the combustible gas mixture 2, said mixture flowing from at least one nozzle means 1 into a combustion chamber and reacting therein in at least one jet flame having a flame front, admixing with said flame front the secondary gas flowing parallel into said reaction chamber from means defining a gap 3 around said nozzle means and controlling the mixing process by suitable selection of the momentum ratio of the two gas streams.

5. A process according to claim 1 comprising introducing the secondary gas stream 14 into a combustion chamber from the bottom of said chamber, introducing the combustible gas mixture 12 into said chamber from at least one nozzle means 11 arranged in the wall thereof transversely or slantingly with respect to said secondary gas stream, admixing said secondary gas stream with the burning combustible gas mixture and controlling the mixing process by suitable selection of the momentum ratio of the two gas streams.

6. A process according to claim 1 wherein the feed components light hydrocarbon, oxygen and ammonia are reacted in jet flames produced by a combustible gas mixture and the ammonia is admixed as the secondary gas stream into said flames.

7. A process according to claim 1 wherein the feed components light hydrocarbon, oxygen and ammonia are reacted in jet flames produced by a combustible gas mixture and hydrogen or carbon monoxide is admixed as the secondary gas stream into said flames.

8. A process according to claim 1 wherein the light hydrocarbon is selected from the group consisting of methane, ethane, propane and ethylene.

TABLE 1

| | 1 | 2 | | 3 | | 4 | 5 | 6 | 7 | 8 | 9 |
|---|---|---|---|---|---|---|---|---|---|---|---|
| Experiment | Hydrocarbon | | $Nm.^3/h.$ | Secondary gas | $Nm.^3/h.$ | Ratio of the stream of volume | C/N | C/O | Yield, percent | Selectivity, percent | Conversion, percent |
| a | Propane | | 1.55 | $H_2$ | 3.0 | 1.8 | 5.1 | 0.78 | 78 | 93 | 84 |
| b | do | | 1.55 | $H_2$ | 3.0 | 2.2 | 2.9 | 0.71 | 66 | 82 | 80 |
| c | do | | 1.5 | CO | 2.6 | 2.1 | 5.1 | 0.78 | 73 | 85 | 86 |
| d | do | | 1.5 | Helium | 2.6 | 2.1 | 5.1 | 0.77 | 58 | 68 | 85 |
| e | Methane | | 3.5 | $H_2$ | 3.0 | 2.5 | 5.5 | 0.52 | 70 | 91 | 77 |
| f | Ethane | | 2.0 | $H_2$ | 3.8 | 1.5 | 5.1 | 0.63 | 70 | 89 | 79 |
| g | Ethylene | | 1.9 | $H_2$ | 4.6 | 1.1 | 5.2 | 0.80 | 82 | 94 | 87 |
| h | Propane | | 1.6 | Ammonia | 0.96 | 4.6 | 4.9 | 0.85 | 77 | 88 | 87 |
| i | do | | 1.25 | do | 1.2 | 2.9 | 3.0 | 0.81 | 66 | 78 | 85 |

TABLE 2

| | 1 Vol.% | 2 Vol.% | 3 Vol.% |
|---|---|---|---|
| HCN | 8.3 | 10.1 | — |
| $NH_3$ | 1.8 | — | — |
| $N_2$ | 1.2 | 1.5 | 1.7 |
| CO | 22.0 | 26.8 | 32.0 |
| $CO_2$ | 4.7 | 5.7 | — |
| $CH_4$ | 1.1 | 1.3 | 1.6 |
| $C_2H_2$ | 1.2 | 1.5 | 1.7 |
| $H_2$ | 43.5 | 53.1 | 63.0 |
| $H_2O$ | 16.2 | — | — |
| | 100.0 | 100.0 | 100.0 |

What is claimed is:

1. A process for carrying out the endothermic reaction of producing hydrogen cyanide from light hydrocarbon, oxygen and ammonia comprising reacting the feed components light hydrocarbon, oxygen and ammonia in flames produced by a combustible gas mixture while admixing a secondary gas stream into said flames.

2. A process according to claim 1 wherein the secondary gas is conducted in parallel flow with the combustible gas mixture and the gas mixture is reacting in at least one jet flame.

3. A process according to claim 1, wherein the combustible gas mixture is injected transversely into the secondary gas

* * * * *